United States Patent [19]

Henshaw et al.

[11] Patent Number: 5,191,574

[45] Date of Patent: Mar. 2, 1993

[54] OPTICAL MEMORY METHOD AND APPARATUS UTILIZING FREQUENCY CHANNELING AND STARK EFFECT

[75] Inventors: Philip D. Henshaw, Carlisle; Steven A. Lis, Lexington, both of Mass.

[73] Assignee: Sparta Systems, Inc., Lexington, Mass.

[21] Appl. No.: 664,767

[22] Filed: Mar. 5, 1991

Related U.S. Application Data

[63] Continuation-in-part of Ser. No. 236,604, Aug. 25, 1988, Pat. No. 4,998,236.

[51] Int. Cl.$^5$ .............................................. G11B 7/00
[52] U.S. Cl. ................................. 369/100; 369/103; 365/113; 365/119
[58] Field of Search ................. 369/100, 103, 112, 94, 369/102; 365/106, 113, 119

[56] References Cited

U.S. PATENT DOCUMENTS

| | | | |
|---|---|---|---|
| 3,771,150 | 11/1973 | Schneider | 340/173 CC |
| 3,829,838 | 8/1974 | Lewis et al. | 340/172.5 |
| 4,038,647 | 7/1977 | Schneider | 340/173 |
| 4,041,476 | 8/1977 | Swainson | 340/173 |
| 4,101,976 | 7/1978 | Castro et al. | 365/119 |
| 4,103,346 | 7/1978 | Haarer et al. | 365/216 |
| 4,288,861 | 9/1981 | Swainson et al. | 365/127 |
| 4,733,369 | 3/1988 | Bogner | 365/119 |
| 4,860,253 | 8/1989 | Owechko et al. | 365/125 |
| 4,998,236 | 3/1991 | Henshaw | 369/103 |
| 5,023,859 | 6/1991 | Eich et al. | 369/100 |

OTHER PUBLICATIONS

Leith et al., "Holographic Data Storage in Three-Dimensional Media", *Applied Optics*, vol. 5, No. 5, Aug. 1966, pp. 1303–1311.

Collier et al., *Optical Holography*, 1971, pp. 454–493.

Gutierrez et al., "Multiple Photochemical Hole Burning in Organic Glasses and Polymers: Spectroscopy and Storage Aspects", *IBM J. Res. Develop.*, vol. 26, No. 2, Mar. 1982, pp. 198–208.

Renn et al., "Holographic Detection of Photochemical Holes", *Chemical Physics* 93 (1985), pp. 157–162, North-Holland, Amsterdam.

Moerner et al., "Can Single-Photon Processes Provide Useful Materials for Frequency-Domain Optical Storage?", *J. Opt. Soc. Am. B*, vol. 2, No. 6, Jun. 1985, pp. 915–1045.

Kash et al., "Optical Spectroscopy of Ultrasmall Structures Etched from Quantum Wells", *Appl. Phys. Lett.* 49(16), 20 Oct. 1986, pp. 1043–1045.

Cibert et al., "Optically Detected Carrier Confinement to One and Zero Dimension in GaAs Quantum Well Wires and Boxes", *Appl. Phys. Lett.* 49(19), 10 Nov. 1986, pp. 1275–1277.

(List continued on next page.)

*Primary Examiner*—Janice A. Howell
*Assistant Examiner*—Kiet T. Nguyen
*Attorney, Agent, or Firm*—Thomas J. Engellenner; John V. Bianco

[57] ABSTRACT

Apparatus for storage and retrieval of digital data includes a multidimensional holographic storage medium for storing phase holographic images representative of the digital data. Selected regions of the medium are independently addressable by a beam of light. The storage medium is a spectral hole burning material having absorption regions independently addressable by selected frequencies of light, and includes selectively bleached absorption structures forming frequency channels. An external electric field of selected voltage can be applied to the storage medium to induce Stark effect broadening of the spectral holes, so that at a given frequency of light, a different phase hologram can be stored for each of a plurality of voltages, whereby multiple phase holograms can be stored for each frequency of light. Alternatively, physical stress can be applied to the storage medium to induce a stress field and associated broadening.

21 Claims, 6 Drawing Sheets

OTHER PUBLICATIONS

Temkin et al., "Low-Temperature Photoluminescence from InGaAs/InP Quantum Wires and Boxes", *Appl. Phys. Lett.* 50(7), 16 Feb. 1987, pp. 413–415.

Kubena et al., "Dot Lithography for Zero-Dimensional Quantum Wells Using Focused Ion Beams", *Appl. Phys. Lett.* 59(22), 1 Jun. 1987, pp. 1589–1591.

Wu et al., "Effect of Size Nonuniformity on the Absorption Spectrum of a Semiconductor Quantum Dot System", *Appl. Phys. Lett.* 51(10), 7 Sep. 1987, pp. 710–712.

Renn et al., "Spectral Hole Burning and Hologram Storage", *Applied Optics*, vol. 26, No. 19, 1 Oct. 1987, pp. 4040–4042.

Psaltis, Demetri, DARPA Conference, Feb., 1988.

Moerner, *Persistent Spectral Hole Burning: Science and Applications*, 1988, pp. 1–15, 65–77, 114–125, and 265–304.

OPTICAL MEMORY METHOD AND APPARATUS UTILIZING FREQUENCY CHANNELING AND STARK EFFECT

The U.S. Government has rights in this invention pursuant to Defense Department Contract No. N6600-86-C-0095.

REFERENCE TO RELATED APPLICATIONS

This application is a continuation-in-part of co-pending U.S Patent Application Ser. No. 236,604 filed Aug. 25, 1988 now U.S. Pat. No. 4,998,236, for "Apparatus for High Density Holographic Data Storage," assigned to the assignee hereof.

The teachings of the above-cited parent application are incorporated herein by reference.

BACKGROUND OF THE INVENTION

This invention relates generally to optical memory techniques and devices, and, more particularly, relates to optical data storage techniques and devices utilizing holographic storage in volume media, in conjunction with coherent writing and reading beams.

In recent years, a wide range of different optical media have been considered or proposed for Providing high capacity data storage and retrieval. The dimensionality of various media is one identifying characteristic of optical storage systems. Two-dimensional media, such as optical disk and microfiche storage devices, are common. Three-dimensional memory media are also possible. Three-dimensional media include, for example, volume holographic memories. Such media is discussed in Collier et al., "Optical Holography" Academic Press, New York (1971), pp. 454–493, incorporated herein by reference.

A second identifiable characteristic is the use of either holographic or bit-oriented storage. Holographic storage is inherently parallel in nature. Although schemes have been proposed for selective erasure of data in holographic memories, selective erasure using bit-oriented storage is conceptually simpler Holographic storage methods in which the reading or writing radiation is incident on the entire memory medium are limited in information capacity by the erasure of old data during reading operations or the storage of new data. However, photon gating or electronic gating of memory planes can solve these problems for both holographic and bit-oriented storage. Holographic storage is less susceptible to dust and media imperfections, but the same effect may be achieved using bit-oriented storage through the use of coding schemes. Holography provides a method of storing and accessing information stored throughout the volume of a medium without the requirement of a complex optical system to access individual planes in the medium.

It is known that multiple two-dimensional planes of data can be stored in a volume holographic medium, and that these planes may be accessed individually by introducing the reference beam into the medium at a different angle for each individual plane of data. A volume medium therefore has three spatial dimensions, corresponding to the dimensionality of the information stored in a two-dimensional output array multiplied by the number of independent reference beam directions in a linear array of reference beams.

Certain conventional optical data storage systems, such as optical disk memory, can provide large storage capacity In particular, 30,000 tracks multiplied by 150,000 bits per track results in a capacity of approximately 560 megabytes on a 12 centimeter optical disk. However, the use of a single detector for readout provides only a serial data stream, which limits the data transfer rate. The disadvantages of this memory device also include difficulties caused by the dynamic focusing and tracking problems associated with a moving disk and the latency or time required to wait for the desired bits to rotate to the reading location.

In other optical data storage systems, cascaded orthogonal beam-steering stages are used to access data Pages stored in a two-dimensional holographic format. In this system, the memory medium is stationary, eliminating the need for active tracking in the beamsteering system. Because the data are stored holographically, no readout optics are required, eliminating the need for a wide field of view high-resolution lens. Parallel readout can be used to obtain an entire two-dimensional array of bits from one beam position, allowing the use of a somewhat slower beamsteering mechanism to be used than for an optical disk, while still maintaining the same data transfer rate. A millisecond deflection time provides a possible data rate of $10^9$ bits per second, which exceeds the data transfer rates of current detector arrays.

However, two-dimensional holographic memory requires a high spatial frequency response memory medium, and is characterized by limited storage capacity and excessive size, because the information is spread out over a two-dimensional area. The storage capacity of two-dimensional holographic memory is also limited by the resolution of the medium. Assuming that an array of 1000 by 1000 bits can be stored in a 1 centimeter by 1 centimeter hologram, a 10 centimeter by 10 centimeter memory plane can contain 100 holograms with $10^6$ bits per hologram or $10^8$ bits in total. Since each bit is approximately 10 micrometers in size at the detector array, the optical system must have an optical configuration of approximately f/20 for a 0.5 micrometer reading wavelength. Thus, the detector must be approximately 20 centimeters from the memory plane. Since none of the pages can be directly on-axis, the pages at the far side of the 10 centimeter by 10 centimeter array must have an angle of approximately 60° between the illumination and the signal beam, corresponding to a hologram fringe spacing of one wavelength, or 0.5 micrometers. Storage of more holograms in a single memory plane would require even greater spatial resolution.

In view of the constraints discussed above, there has long been a need for high capacity optical data storage techniques and devices that eliminate the requirements for mechanical translation or rotation of a storage medium and read/write element —with its associated latency and tracking problems —while providing compact, high density data storage.

High capacity multi-dimensional optical data storage systems are disclosed in related U.S. patent application Ser. No. 236,604. The storage devices disclosed therein utilize a four-dimensional optical storage medium, having three spatial dimensions and one wavelength-dependent dimension. Photochemical spectral hole burning materials (SHBs) are employed to store holograms at multiple wavelengths. While the data storage systems discussed in U.S. patent application Ser. No. 236,604 offer substantial improvements in storage density over conventional storage systems, even greater resistance to erasure and data density may be required in future optical computing applications.

It is accordingly an object of the invention to provide improved high capacity optical data storage methods and systems.

It is another object of the invention to provide such systems affording high density data storage.

A further object of the invention is to provide optical data storage methods and systems having high access speeds, in which both the storage medium and the read/write element are substantially stationary.

It is another object of the invention to provide methods and devices adapted for use in high speed optical computing interconnection systems.

Other general and specific objects of the invention will in part be obvious and will in part appear hereinafter.

SUMMARY OF THE INVENTION

The foregoing objects are attained by the invention, which provides methods and apparatus for storage and retrieval of digital data. In one aspect of the invention, a multidimensional holographic storage medium is provided for storing phase holographic images representative of the digital data. Selected frequency or spatial regions of the medium are independently addressable by a beam of light.

The storage medium is a spectral hole burning (SHB) material having absorption regions independently addressable by selected frequencies of light, and including selectively bleached absorption structures forming frequency channels. Frequency channeling elements, including a narrow linewidth tunable laser, provide controlled bleaching of the SHB material to generate these frequency channels. The SHB material Can include porphyrin tautomers in a polyethylene matrix, organic dyes in organic polymer host materials, organic dyes in inorganic host materials, or color centers in glass.

Read/write elements, including a frequency agile laser for generating an interrogating beam of laser light having at least one selected frequency, enable reading and writing of holographic images into and out of the storage medium. Beam steering elements steer the laser beam in at least a first direction, and a spatial light modulator interposed between the frequency agile laser and the medium provides selected spatial modulation of the interrogating beam of laser light. The beam steering elements and frequency agile laser can be controlled by a microprocessor and associated control elements, to vary frequency and spatial position of the interrogating beam.

The invention also provides a method for storing digital data, including the steps of configuring a multidimensional holographic storage medium from a spectral hole burning material, utilizing a laser to generate in the spectral hole burning material a set of selectively bleached absorption structures to form addressable frequency channels, and utilizing a laser to write phase holograms representative of the digital data in index modulation regions near spectral hole absorption edges.

A further aspect of the invention includes optical interconnection apparatus for selectively interconnecting an input optical plane and an output optical plane in accordance with selected interconnection encodings. The optical interconnection apparatus includes a multidimensional holographic storage medium for storing phase holographic images representative of the interconnection encodings. Selected regions of the medium containing the holographic images are independently addressable by an interrogating beam of light, the position and frequency of which can be controlled. The SHB material contains selectively bleached absorption structures forming addressable frequency channels, and the interconnection-specifying holograms are stored in index modulation regions near spectral hole absorption edges.

In this aspect of the invention, feedback elements can be employed for transmitting feedback signals from selected nodes in the output plane to selected nodes in the input plane.

The invention can be practiced in optical computing systems for digital information processing, utilizing a multidimensional holographic storage medium for storing phase holographic images representative of digital data. The medium includes a· spectral hole burning (SHB) material having absorption regions independently addressable by an interrogating beam of light having a selected frequency and position. In accord with the invention, the SHB material contains selectively bleached absorption structures forming addressable frequency channels.

In a further aspect of the invention, an external electric field of selected voltage can be applied to the storage medium to induce Stark effect broadening of the spectral holes, so that at a given frequency of light, a different phase hologram can be stored for each of a plurality of voltages. Multiple phase holograms can thus be stored at each given frequency of light. The voltage of the applied electric field can be varied, thereby utilizing the Stark effect to address holographic images recorded at selected electric field strengths. The Stark effect accordingly provides another "dimension" of information storage within the holographic medium.

Similar broadening can also be induced by applying a physical stress of selected magnitude to the optical storage medium This stress alters the local environment of each recording location in the medium, changing the frequency of response of each recording location, so that at a given frequency of interrogating light, a different phase hologram can be stored for each of a plurality of electric field magnitudes. Consequently, multiple phase holograms can be stored for each frequency of interrogating light.

By controlling the magnitude of the physical stress applied to the optical storage medium, the system can address holographic images recorded at different stress field magnitudes. In one aspect of the invention, physical stress is applied to the optical storage medium by at least one piezoelectric element in contact with at least one surface of the optical storage medium. The piezoelectric element can be excited by an applied electrical signal.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
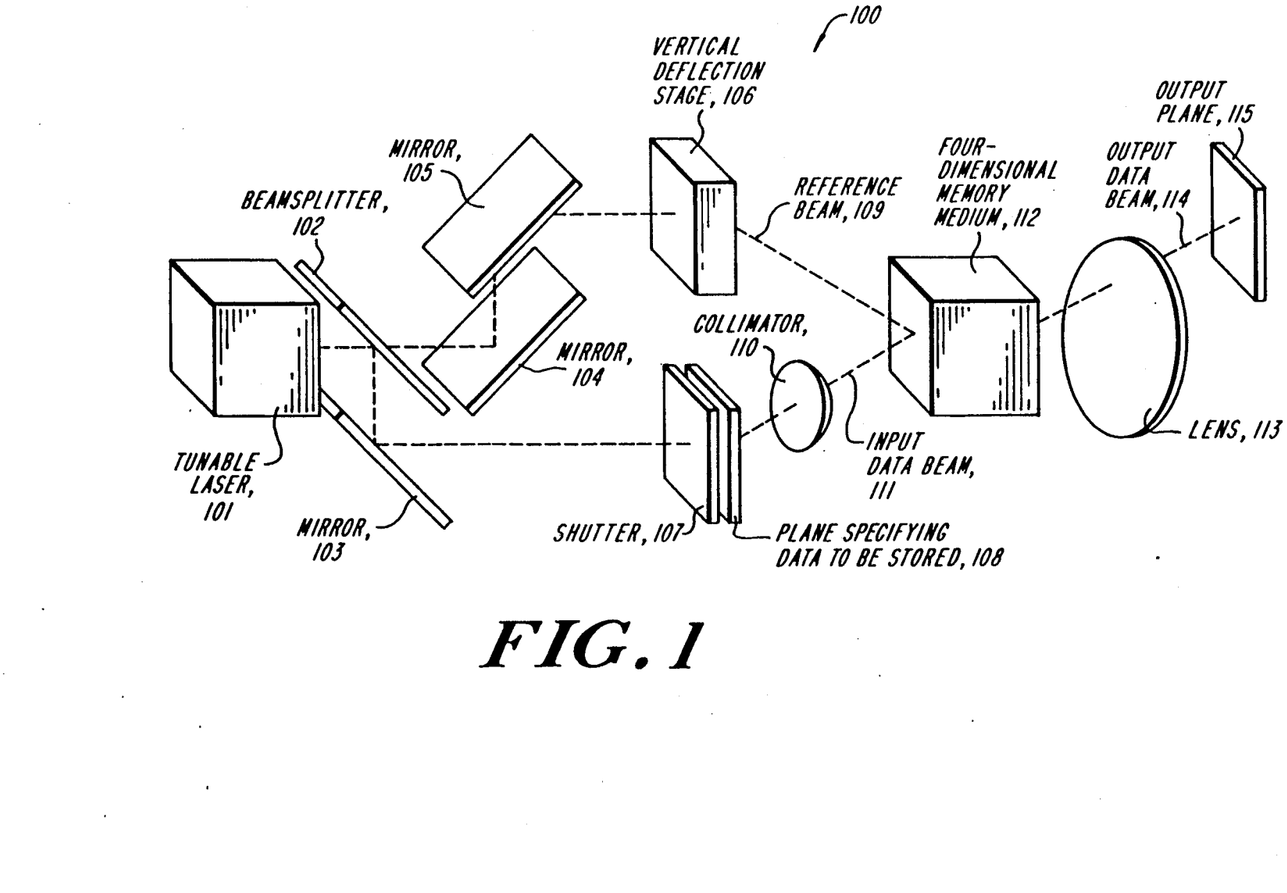
FIG. 1 is a schematic diagram depicting a four dimensional memory device constructed in accordance with the disclosure of related U.S. patent application Ser. No. 236,604.

FIG. 1 is a schematic diagram depicting a four dimensional memory device constructed in accordance with the disclosure of related U.S patent application No. 236,604. The optical data storage apparatus 100 shown in FIG. 1 uses a conventional tunable laser source 101 of coherent radiation for optically writing holographic data representations in an optical storage or memory medium 112 and optically reading holographic data representations from the memory medium 112. The reading and writing of holographic data is known in the art, and is discussed in R.J. Collier et al., *Optical Holography*, Academic Press, New York (1971), pp 454-493, incorporated herein by reference.

Unlike conventional holographic storage media, however, memory medium 112, as disclosed in related U.S. patent application Ser. No. 236,604, is a four-dimensional optical storage medium, having three spatial dimensions and one wavelength-dependent dimension. Photochemical spectral hole burning materials (SHBs) can be employed in the illustrated system to store holograms at multiple wavelengths. It is known in the art that absorption sites in the volume of an SHB material are affected by the local polymer environment to absorb photons at slightly different wavelengths. At very low temperatures, each absorption site is unaffected by thermal phonons, so the spectral width of the absorption is very narrow. Since the volume of an absorption site is very small, much less than a cubic wavelength, many absorption sites are available in each region which would normally store one sample of the hologram fringe pattern, and multiple fringe patterns can be stored using different optical wavelengths.

Optical memory media with inhomogeneously broadened spectral absorption permit multiple bits to be stored in any physical wavelength-sized region. The number of bits is proportional to the ratio of the inhomogeneous linewidth of the absorption spectrum to the homogeneous linewidth. For example, in SHB materials this ratio can be as high as $10^3$ to $10^7$. SHB materials are discussed in greater detail in W.E. Moerner, ed., *Persistent Spectral Hole-Burning: Science and Applications*, Springer-Verlag, N.Y. (1988), incorporated herein by reference; and A.R. Gutierrez et al., "Multiple Photochemical Hole Burning in Organic Glasses and Polymers: Spectroscopy and Storage Aspects," IBM Vol. 26 *J. Res. Develop.* p. 198 (1982), incorporated herein by reference.

As disclosed in related U.S. patent application Ser. No. 236,604, multiple quantum well dot structures can also be utilized to provide a four-dimensional memory medium. It is known in the art that the wave function of a conduction electron trapped in a cubic well or dot structure defines a series of sharp resonances. These resonances correspond to preferred photon energies for absorbed photons to "bump" an electron into the conduction band. By changing the well dimensions, the wavelength of absorption can be changed. The dimensions of a quantum dot can be made smaller than a wavelength, so that in each region that would normally store one hologram fringe sample, multiple fringe pattern samples can be stored, corresponding to the number of quantum dots of different dimensions within that region. Quantum dot materials are discussed in greater detail in H. Temkin et al., "Low-Temperature Photoluminescence from InGaAs/InP Quantum Wires and Boxes," 50 *App. Phys. Lett.* 413-415, incorporated herein by reference; and Wei-Yu Wu et al., "Effect of Size Non-Uniformity on the Absorption Spectrum of a Semiconductor Quantum Dot System," 51 *Applied Physics Letters* 710 (1987), incorporated herein by reference.

Referring again to FIG. 1, the laser beam generated by the tunable laser source 101 is divided into two mutually coherent beams of radiation by the beamsplitter 102. The first of these two beams is directed by mirrors 104, 105 into a conventional beam deflection stage 106, in which the beam can be deflected, for example, vertically (i.e., in the plane of the drawing) to provide a reference beam 109. The deflection stage 106 preferably provides selected deflection in response to externally applied control signals.

Those skilled in the art will understand that the beam can be controlled in several different ways. For example, utilizing conventional means, the laser wavelength spectrum can be tuned, the laser beam direction can be varied, or the laser wavefront curvature can be changed. Each of these laser beam control methods provides a means to access information stored in the optical medium. Techniques for producing tunable lasers are well known, as are means for producing lasers with a "comb" spectrum. A large number of means for steering a beam of laser radiation exist, including moving mirrors, acousto-optic deflectors, electro-optic deflectors, and photorefractive deflectors.

The reference beam 109 is directed into the four-dimensional memory medium 112, where the beam is used as the reference beam during the writing of information in a holographic format, and as the reconstruction beam during the reading of data stored in a holographic format.

The second beam derived from the tunable laser 101 by means of the beamsplitter 102 is directed by mirror 103 through an external shutter 107 to a data-specifying plane 108. The data-specifying plane 108 includes a conventional spatially-variable transparency which carries a pattern of data in the form of a two-dimensional array of bright or dark spots. This pattern is impressed upon, and carried by, the beam passing through the data-specifying plane 108. The open or closed state of shutter 107 controls execution of the alternate writing and reading functions of the memory apparatus 100.

During writing, the shutter 107 is open, permitting the beam from mirror 103 to reach the data-specifying plane 108. The input data beam 111, which carries the input data specified by data-specifying plane 108, passes through collimator 110 to the memory medium 112 where the input data beam 111 is combined with the reference beam 109. The reference beam 109 and the input data beam 111 are coherent, and form an interference pattern throughout the volume of the memory medium 112. This interference pattern, when recorded in the memory medium at a specific wavelength, can be used to reconstruct the data Pattern impressed on the data beam 111.

During the reading process, the shutter 107 is closed, and only the radiation in the reference beam 109 reaches the memory medium 112. The memory medium 112 transmits diffracted output radiation which is collimated by lens 113 to produce an output data beam 114. In accordance with the invention, when a large number of different patterns are stored in the memory medium 112, the pattern of interest can be selected by controlling the direction and wavelength of the reference beam 109 to be exactly equal to the direction and wavelength used to record the desired data. When this equality is satisfied, the beam 114 carrying the output data diffracted from the memory medium 112 will project the desired array of output data onto the output plane 115. The output plane 115 may be, for example, a two-dimensional CCD array which produces electrical signals responsive to the light incident upon its surface. Alternatively, the output plane 115 may be a spatial light modulating optical computing element.

An important feature of the invention is the large data capacity which is achieved due to the large number of independent reference beams that can be generated by varying the angle and wavelength of the reference beam. Extremely large storage capacity can be achieved through the use of angular and spectral multiplexing of data in a thick volume medium. For example, the memory medium can contain multiple holograms, each representing an array of $1000 \times 1000$ bits. By varying the reference beam angle, as many as 500 holograms can be stored at each wavelength. Using 50,000 different wavelengths to store data in the medium, a total of $2.5 \times 10^{13}$, bits can be stored in a 1 centimeter cube. By utilizing applied electric or stress fields to rearrange the spectral hole profile, providing a smooth profile for further recording, an additional enhancement of up to 100 can be achieved resulting in a storage capacity of up to $2.5 \times 10^{15}$ bits/cm.

In addition to the extremely large capacity provided by the four-dimensional memory apparatus, four-dimensional memory is fundamentally necessary for certain important applications. Neural network research, for example, has investigated the means for connecting two fully populated data planes in a selectable fashion. The selectable connection of two fully-populated two-dimensional planes has been an important goal of recent optical computing research. The ability to realize a completely selectable interconnection device has important implications for neural network application to such important problems as vision preprocessing, pattern and speech recognition, and the solution of difficult mathematical problems which can be expressed in matrix form.

It has been shown that due to duplication of volume gratings stored in the memory medium, selectable connections cannot be achieved between two fully-populated two dimensional planes Instead, a solution has been proposed which limits the number of populated elements in the input and output planes to $K^{3/2}$ where K is proportional to S/lambda, with S being the dimension of one side of the input plane or interconnection medium, and lambda being the wavelength used to illuminate the input plane. The required $K^3$ interconnections can be stored in a volume of size proportional to K wavelengths on a side.

By utilizing an optical memory medium with four independent dimensions available for storage of interconnections, $K^4$ connections can be stored, sufficient to interconnect two Planes each containing $K^2$ elements. These $K^2$ elements can be placed so as to completely fill the input and output planes.

The four dimensional optical memory apparatus of FIG. 1 can be used to implement one stage of a neural network which connects two 2-dimensional planes; such a network can be used, for example, in speech or vision preprocessing, or in the solution of complicated optimization problems which are difficult to perform on current digital computers.

Figure 2:
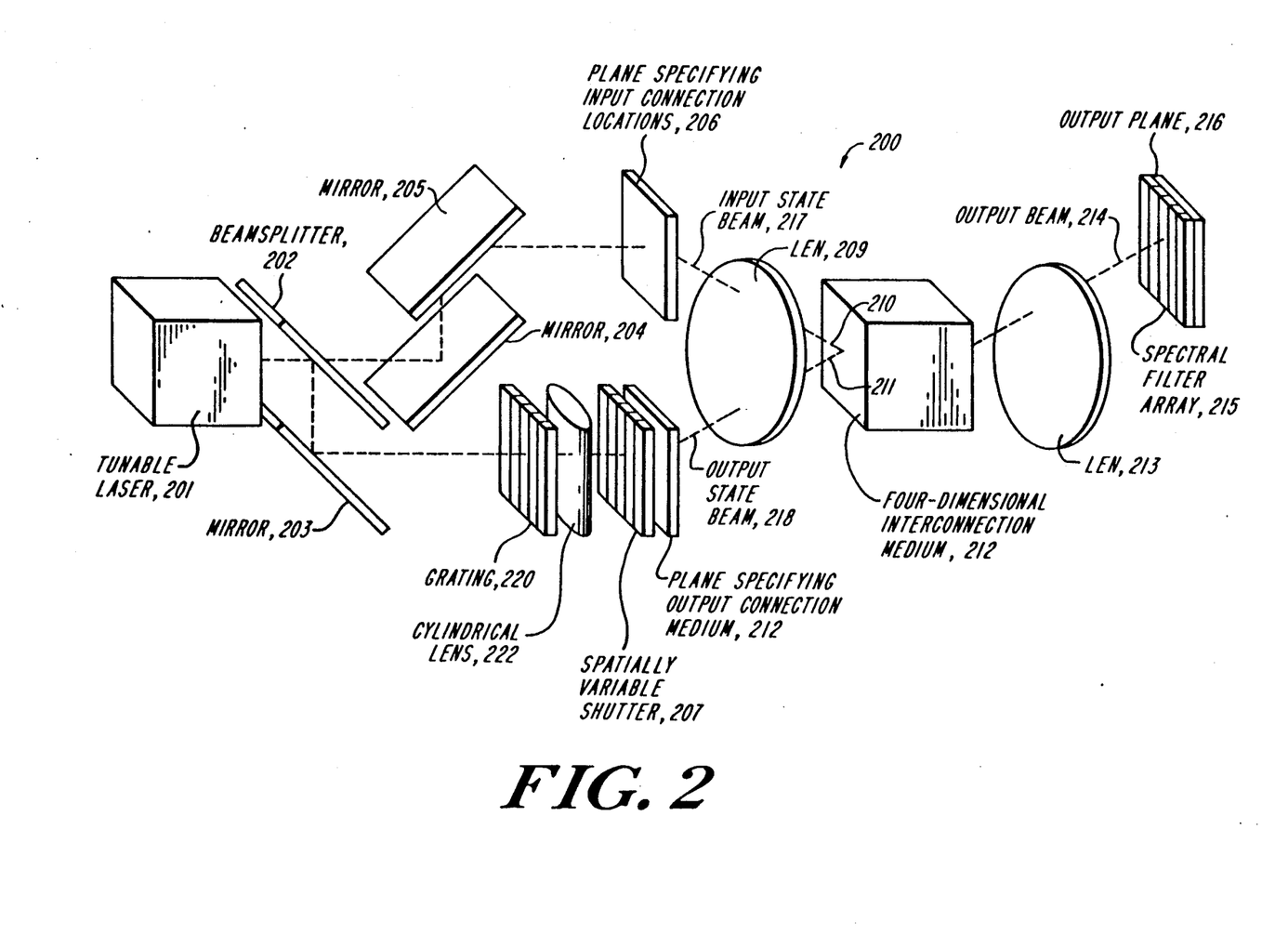
FIG. 2 is a schematic diagram depicting an optical computing interconnection apparatus constructed in accordance with the disclosure of related U.S. patent application Ser. No. 236,604, utilizing a four dimensional memory for providing selected interconnections between the input plane and the output plane.

FIG. 2 depicts a four-dimensional interconnection apparatus 200, as disclosed in related U.S. patent application Ser. No. 236,604. The interconnection apparatus 200 operates in a manner similar to that of the system illustrated in FIG. 1, utilizing a tunable laser source 201 of coherent radiation for executing optical interconnection operations for the interconnection of designated active sites of one memory element (referred to as the input) with the designated active sites of another memory element (referred to as the output). These operations include optically writing data in the four-dimensional interconnection medium 212 and optically reading data from the medium.

The beam generated by the tunable laser source 201 is divided into two mutually coherent beams of radiation by the beamsplitter 202. The first of these two beams is directed by mirrors 204, 205 through an input connection-specifying plane 206. The input connection-specifying plane 206 includes a conventional spatially-variable transparency which carries a pattern of data in the form of a two-dimensional array of bright or dark spots. The pattern carried on the input connection-specifying plane specifies designated active input locations which are to be connected to designated active output locations. This pattern is impressed upon the beam from mirror 205 to generate an input state beam 217.

The second beam derived from the tunable laser by means of the beamsplitter is directed using mirror 203 to an output connection-specifying plane 208 controlled by spatially variable shutter 207. Output connection-specifying plane 208 includes a spatially-variable transparency carrying a pattern of data in the form of a two-dimensional array of bright or dark spots. This pattern is impressed on the beam from mirror 203 to transmit an output state beam 218 specifying the designated active output locations. The spatially-variable shutter 207 controls whether the "interconnection" (reading) or "learning" (writing) function of the network apparatus 200 will be executed.

During the learning operation, the shutter 207 is opened at a sequence of locations forming a set of vertical stripes, permitting the output state beam 218 to reach the interconnection medium 212 through lens 209, where it is combined with the input state beam 217. The two beams are coherent, and form an interference pattern throughout the volume of the four-dimensional interconnection medium 212. In accordance with the invention, a different wavelength is used for each vertical stripe to prevent crosstalk between the patterns stored in association with different vertical columns. Each different wavelength is directed to the proper vertical stripe by a grating 220 and a cylindrical lens 222.

Those skilled in the art will understand that this interference pattern, when recorded in the interconnection medium 212 at a specific wavelength, can be used to connect the data activity at a series of input locations to an selectable set of output locations or states arranged in communication with the two-dimensional output Plane 216. In particular, the selected interference pattern stored in interconnection medium 212 is transmitted through collimator 213, and the resulting output beam 214 is projected onto output plane 216, which may be, for example, a two-dimensional CCD array.

During the interconnection operation, the shutter 207 is closed, and only the radiation in the input state beam 217 reaches the interconnection medium 212. Those skilled in the art will appreciate that when many different patterns have been stored in the interconnection medium 212, the medium of interest can be used to execute selectable connections between input states and output states by simultaneously illuminating all input states with all the wavelengths used during the learning process. Each input state can be connected to any output state, but only the contributions at the output at the wavelength used to record connections to that state are of interest. A spectral filter array 215, positioned in the path of output beam 214 can be utilized for filtering the beam directed at output plane 216, to select the proper contributions for each state.

SPECTRAL HOLE BURNING

Figure 3:
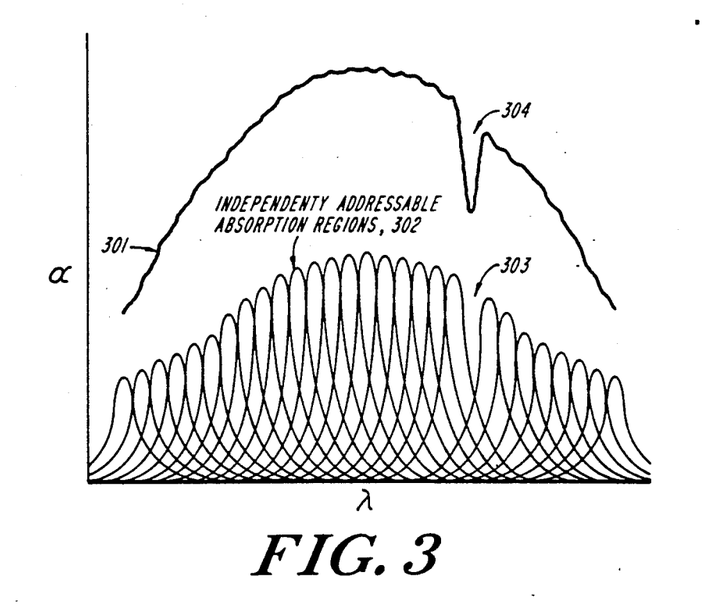
FIG. 3 is a graph of absorption versus wavelength, schematically illustrating the principle of spectral hole burning.

Understanding of the invention is facilitated by further explanation of spectral hole burning, illustrated on a molecular level by FIG. 3. FIG. 3 depicts the relationship between absorption and wavelength for a sample having guest molecules embedded in a solid host matrix, such as a rigid glass or polymer film, including the spectral profile of the overall absorption band for all sites (301); the absorption lines of individual sites (302); removal of one site by hole burning (303); and a hole dip (304) caused by spectral hole burning.

Within the sample, the degree of guest-host interaction for a molecule embedded in the solid matrix depends upon the environment surrounding each molecule. A potentially infinite number of different surroundings exist around each embedded molecule. This leads to broad absorption bands with approximately Gaussian profiles. The inhomogeneously broadened absorption bands shown in FIG. 3 thus represent a superposition of sharp homogeneously broadened lines from individual molecules occupying various sites in the solid host matrix.

A single molecule has a set of energy levels between which transitions are allowed when the molecule interacts with a photon of light. If the energy of the photon approximately matches one of the required transition energies, the photon can be absorbed by the molecule. If a chemical change to the molecule is induced upon absorption, the absorption levels of the new molecule will not match that of the original molecule. Therefore, the new molecule will probably not absorb light at the frequency of the first photon. In this way, absorption at a specific frequency can be modulated by exposure to light, permitting the recording of information. Utilizing the full range of frequency available can provide an enormous potential storage capacity when coupled with the spatial dimensions.

As depicted in FIG. 3, the inhomogeneous absorption peak for an SHB material, such as a glass sample, is composed of a large number of individual molecular populations, each of which can be individually addressed by selecting the frequency of the interrogating light beam.

The width of the absorption peak is determined by the fundamental lifetime of the energy levels involved, and the vibrations of the molecule. The resultant spectral width is called the homogeneous linewidth At low temperatures, the broadening due to thermal effects can be reduced to the 10 to 30 MHz level If a large number of molecules are immersed in a single crystal, due to the highly periodic structure of the lattice, all the molecules will absorb at the same frequency. The frequency of absorption will be altered somewhat by the nearby molecules, but the modifications will be uniform for each. As noted above, if the molecules are contained, for example, in a glass sample that has little or no short range order, then each molecule will see a separate environment, providing separate absorption frequencies. This spread in absorption caused by the variation in molecular environment is the inhomogeneous linewidth, and is generally quite large, on the order of 10 terahertz or more. (For light at a wavelength of 600 nanometers, ten terahertz is approximately ten nanometers wide.)

Irradiating the sample at a single frequency which causes a photochemical change can effectively burn a hole in the medium over a narrow frequency range. In particular, if the sample is irradiated with a spectrally narrow laser beam, only those molecules that absorb the monochromatic laser light can undergo a photoreaction. The photoproducts, which generally absorb at a different spectral position, will leave a dip or hole in the absorption band at the spectral position of the irradiation, as indicated in FIG. 3. The width of the hole in frequency space is simply the homogeneous linewidth of medium. This effect has been observed with spectral widths ranging from 1 gigahertz at 77° Kelvin to 10 megahertz at 1° Kelvin. Hole burning thus permits selective detection of the sharp homogeneously broadened line profile within an inhomogeneously broadened absorption band.

Analysis indicates that available SHB materials lend themselves well to the holographic storage approach, in contrast to the bit oriented approach disclosed in Moerner et al., J. Opt. Soc. Am. B2 (1985) 915–924, which has been found to display significant material problems. In particular, experiments conducted by the assignee of this application have demonstrated that available SHB materials are highly suited to holographic storage techniques and that the low temperature operation of the material also permits high efficiency and low power consumption storage and retrieval—with less than 10 milliwatts laser power for an ultra-high capacity system.

The SHB materials can include porphyrin tautomers in a polyethylene matrix; organic dyes in organic polymer host materials, organic dyes in inorganic host materials, or color centers in glass. Several candidate materials can be easily prepared from commercially available supplies. Some preferred host materials are polyethylene and polymethylmethacrylate (common plastics).

By utilizing a spectral hole burning medium in conjunction with holographic storage, the systems depicted in FIGS. 1 and 2 (and discussed in related U.S. patent application Ser. No. 236,604) provide enhanced data storage density. Holographic storage of data in a volume medium provides much higher storage capacity than that afforded by two-dimensional media, without the processing requirements associated with silicon-based integrated circuit memories. Spectral hole burning (SHB) allows storage and access to data as a function of frequency, with very high densities of data being allowed in frequency space.

However, a fundamental limitation of conventional spectral hole burning is that it is primarily an absorption phenomenon. In a conventional bit-oriented memory apparatus, absorptive spectral hole burning is acceptable because it provides a "black and white" demarcation of the bit, which translates directly to the measured light signal. Unfortunately, this same absorptive attribute of conventional spectral hole burning also limits the efficiency of the holograms that can be stored, and therefore the number of holograms that can be stored. Both bit-oriented and holographic memories based on absorption require large amounts of light to be absorbed during reading operations, causing erasure of the data. Moreover, the optical addressability of conventional bit-oriented optical memories is constrained by a material thickness limited to the depth of focus—and thus resolution —of the optical system. The full volume of a thick material, on the order of 0.5 to 1 centimeter, is therefore difficult to address.

The present invention overcomes these limitations, by utilizing refractive index modulation holograms, or phase holograms, which are recorded using the real part of the material's refractive index, and which diffract light without significant absorption. The utilization of phase holograms permits data storage in depth, and reading of data without erasure. These are two critical factors in achieving extremely high data density in a practical storage system.

PHASE HOLOGRAMS

The present invention utilizes spectral hole burning in conjunction with phase holograms—i.e., using the real part of the refractive index for recording. In order to maintain usable diffraction efficiency with a large number of overlapping holograms, refractive index effects must be used for storage. The invention utilizes a unique method which allows the recording of refractive index holograms in SHB materials that have previously been considered only in terms of absorptive effects. When fully exploited, the estimated storage density achievable with this novel approach is $2.5 \times 10^{13}$ or greater, limited only by the number of molecules required to store a single bit.

Figure 4:
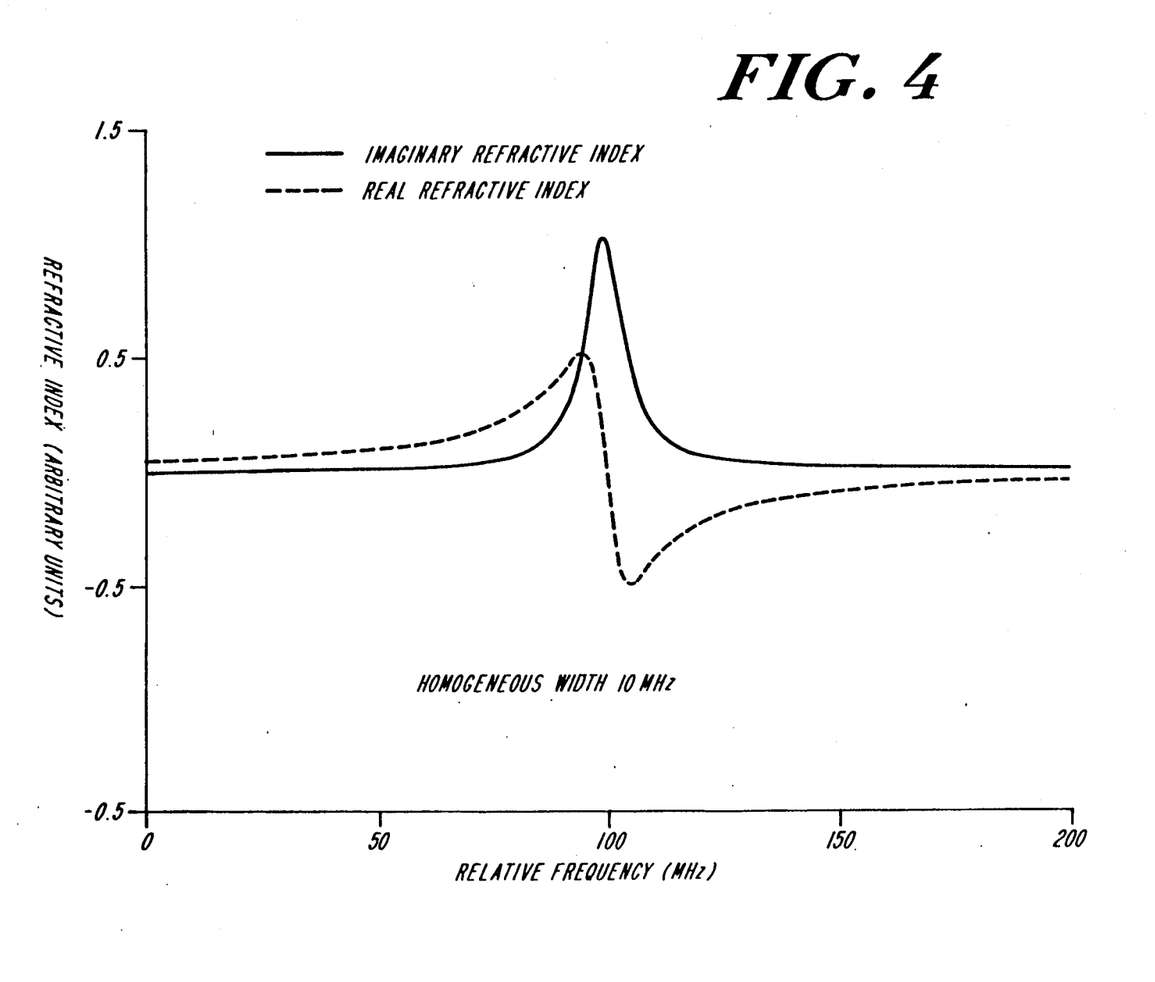
FIG. 4 is a graph illustrating the principle of phase hologram writing with regard to the relationship between real and imaginary refractive indices for an SHB material.

The generation of phase holograms can be described with reference to the dielectric constant and refractive indices of the storage medium, as depicted in FIG. 4. If a single molecule of a medium is modeled as a slightly damped harmonic oscillator, mathematical functions can be derived to relate the real and imaginary parts of the material's refractive index. The known Kramer-Kronig function indicates the relationship between the real—i.e. refractive —component of the refractive index and the imaginary or absorptive component of refractive index.

FIG. 4 depicts this relationship for a single absorption line. Due to a spectral absorption at a single frequency (only homogeneously broadened) the real component is modified in the vicinity of the absorption peak. The significant feature of this relationship is that the absorption component falls off more rapidly than the real or refractive component. In accord with the invention, the absorption is modulated spatially so that optical interrogating elements can read a phase hologram when the reading frequency is off-resonance, and an absorption hologram when on-resonance. If the modulation is large enough and the absorption at the reading frequency low enough, efficiency approaching 100 percent is possible, limited only by the absorption tail.

Figure 5:
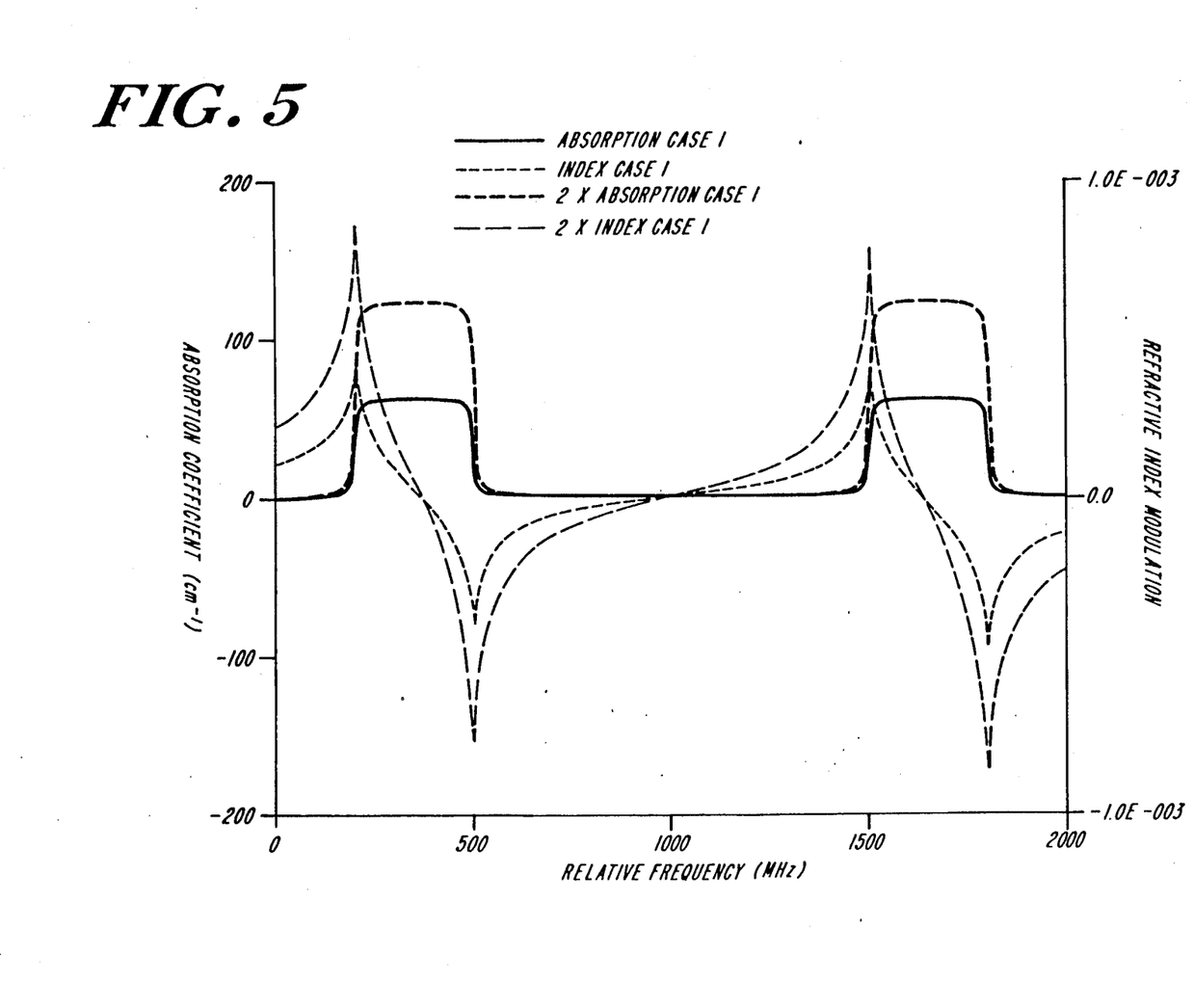
FIG. 5 is a graph depicting the principle of frequency channelling with regard t adjacent absorption structures.

If the absorption peak is broadened by using a multiplicity of populations centered over a range of frequencies, then the real part of the refractive index can be enhanced near the absorption edge. This effect is logarithmic with frequency range, but as depicted in FIG. 5, the effect can be large enough to make the Peak of the real component of the refractive index modulation even larger than the peak of the imaginary component. Their locations in frequency space are still shifted relative to each other, allowing reading in a low absorption region of the spectrum. This structure can be replicated many times in frequency space and each can be accessed independently simply by changing illumination frequency.

In one practice of the invention, writing operations are also executed in a frequency-space region corresponding to the low absorption frequency tail. Absorption in the tail region permits modulation of absorption throughout the absorption range of the broad population peak, but because the absorption is low, it also permits modulation of the absorption through the depth of the material. This enables efficient and selective holograms to be generated, and enables the system to fully exploit the capacity of a large molecular population without the interrogating light being completely absorbed by it.

In accord with the invention, reading operations are executed at a frequency shifted slightly further down the tail region to permit reading of the phase hologram with reduced absorption and with reduced erasure. This frequency shift can be very small, depending on overall system needs, because operation at low temperature permits narrow homogeneous linewidths. The small frequency shift required permits hologram storage with minimal optical aberrations.

FREQUENCY CHANNELING

Figure 7:
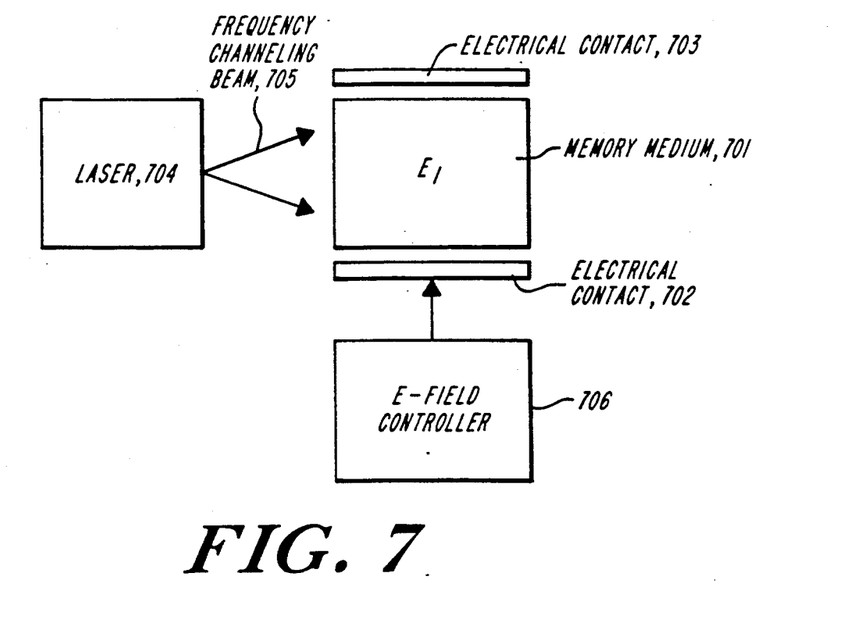
FIG. 7 is a schematic diagram depicting an embodiment of the invention utilizing an applied electric field to generate rearrangement of the spectral hole profile to enhance the recording capacity.

The invention Provides access to the full storage capabilities of volume media, as illustrated in FIG. 7, by utilizing a narrow linewidth tunable laser 704 to generate a beam 705 that burns or bleaches regions of frequency space, referred to as frequency channels, into the medium 701 prior to data storage. This bleaching can be generated by the same data-recording laser as used for data writing operations. The frequency channels allow efficient diffraction in material which is highly doped.

The laser 704 can be then utilized to record phase holograms near the absorption edge where the refractive index modulation is appreciable. In these regions, the real component is modulated by the molecular population present in the adjacent absorptive structure.

This principle is illustrated in FIG. 5. The high molecular population within the absorption structure provides a large reservoir of potential storage capacity. The transparent channels effectively provide "access channels" to the vast storage capacity of the SHB material. The refractive index modulation present within the bleached channels is adequate to allow the storage of many high efficiency phase holograms, and many of these channels can be Contained within the frequency range of the SHB material.

These channels thus enable efficient reading and writing of data, while allowing for high molecular densities in the adjacent absorption structures where the data is actually stored.

The burning of channels effectively constitutes a Processing of the material prior to, or during, storage operations. Those skilled in the art will appreciate that this processing can be accomplished in the illustrated memory unit.

The frequency channeling method is also compatible with further augmentation of data storage by Stark broadening which, as described below, provides extra storage as a function of applied field.

Because the real part of the index modulation falls off quite slowly, there is the potential for cross-talk between absorption structures. This can be reduced by allowing space between structures. The cross-talk effect can be seen as an asymmetry in the index modulation in FIG. 5. Because two absorption structures are present in the simulation shown therein, one can see that the positive lobe of the real index is greater on the left absorption structure, than the positive lobe on the right structure. The solution to this problem is to provide frequency space between absorption structures. The space required is related to the cross-talk limits of the system and the homogeneous linewidth.

Large index modulations are possible, which can provide a significant dynamic range to the medium —i.e., a number of holograms can be superimposed at the same wavelength and angle. For the case shown in FIG. 5, absorption is reduced by a factor of 200 from the absorption peak at a point 200 MHz from the absorption edge. Thus, for an absorption peak of 120 $cm^{-1}$, the system can easily read and write at a frequency where the absorption is only 0.6 $cm^{-1}$. This permits relatively high transmittance, of approximately 56 percent, for reading and writing. Higher efficiency can be attained where required. The magnitude of the real part of the refractive index modulation at this frequency is $2 \times 10^{-4}$.

Analysis has demonstrated that in a medium of 1 centimeter thickness, at least 7 holograms can be stored at 56 percent efficiency, or 200 holograms at 0.1 percent efficiency. By reducing the peak absorption by a factor of 7 the system can store a single hologram at each frequency at 91 percent efficiency.

Currently available materials can provide the performance required by the illustrated system. A typical organic material such as porphyrin, for example, has a molecular weight of 300 grams/mole. At $6.02 \times 10^{23}$ molecules/mole, a medium density of about 1 gram/$cm^3$, and a 1 percent doping density, this yields $2 \times 10^{19}$ molecules/$cm^3$. To provide adequate absorption at each 10 MHz frequency interval, the number of molecules times the absorption cross-section must be high enough to give an absorption coefficient of approximately 100 $cm^{-1}$. In a 10 terahertz inhomogeneous band there are $10^6$ homogeneous widths, thus $10^{13}$ molecules/$cm^3$ in each interval. Consequently, to attain the appropriate absorption coefficient requires a capture cross-section of about $10^{-11}$ $cm^2$/molecule. This is readily available among the materials that have already been studied. It should also be noted that these materials are also erasable.

STARK EFFECT

Figure 6:
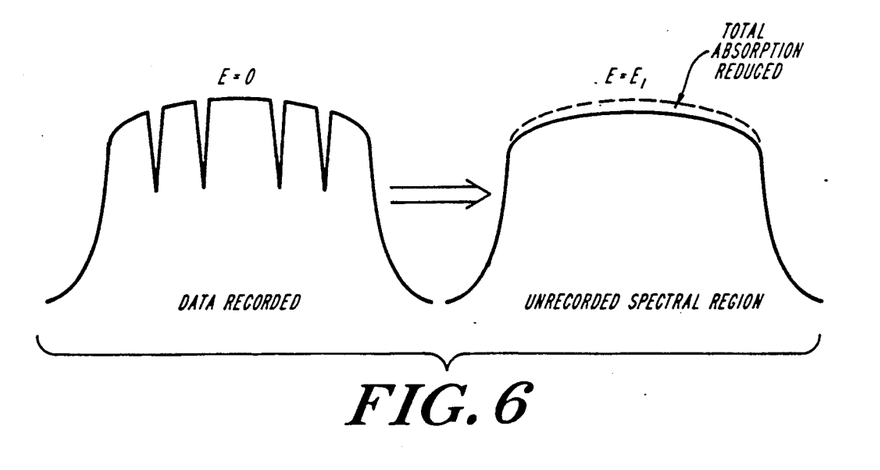
FIG. 6 is a graph depicting the principle of Stark effect broadening.

FIG. 6 depicts the principle of the Stark effect enhancement to spectral hole burning. The Stark effect involves the interaction of the permanent electric dipole moment and the polarizability of an electronic state with an electric field, which leads to energy level shifts that depend on the field strength and the orientation of the molecule with respect to the electric field. In a polymer matrix the guest molecules are randomly oriented. The transition energy between two electronic states will show a small shift under the influence of the electric field. Due to the random orientation of the guest molecules, the superposition of the shifted transitions results in a symmetrically broadened, shallower hole profile. By application of sufficient field, the spectral hole profile can be completely rearranged resulting in a smooth profile suitable for further recording of data. This process is completely reversible, and the initially recorded data can be observed again if the initial conditions are restored.

Spectral lines can thus be broadened under the influence of static electric field. For a single molecular population—one which has a homogeneous linewidth with no applied field—the absorption peak is broadened. However, this is not a broadening of the homogeneous width, but is a broadening of the population. Adjacent populations in frequency space can then overlap and be rearranged by the electric field.

FIG. 6 illustrates this principle, depicting absorption at E = 0 and at a given electric field strength E1. At each frequency and electric field coordinate pair, a separate spectral hole can be created within the limits of the homogeneous spectral width. The number of discrete electric fields that can be applied will be limited only by the molecular dipole moments, the homogeneous linewidth, and the breakdown limits of the material. More than 100 spectral holes can be made at a single frequency, which are independently selectable by electric field. This is not simply a redundancy in the concept of the spectral hole burning, but is an additional parametric control that allows greater access to more memory.

As indicated in FIG. 6, the recording of data at each electric field strength reduces the total molecular population available for recording. If the fraction of the population used at each electric field strength is small, then the dynamic range as a function of electric field can be large.

Apparatus for data storage utilizing the Stark effect is schematically illustrated in FIG. 7. Electrical contact plates 702 and 703 are placed on opposite sides of memory medium 701. A selected voltage is applied to the contacts 702, 703 by controller 706, thereby generating a selected electric field across the memory medium 701.

As indicated in FIG. 7, the Stark effect enhancement can be utilized in conjunction with the above described frequency channels used for hologram reading and writing. The only requirement is that the channels be burned in at each applied field strength. This will tend to reduce the total available molecular population to be modulated, but this reduction is far outweighed by the enhanced access.

Figure 8:
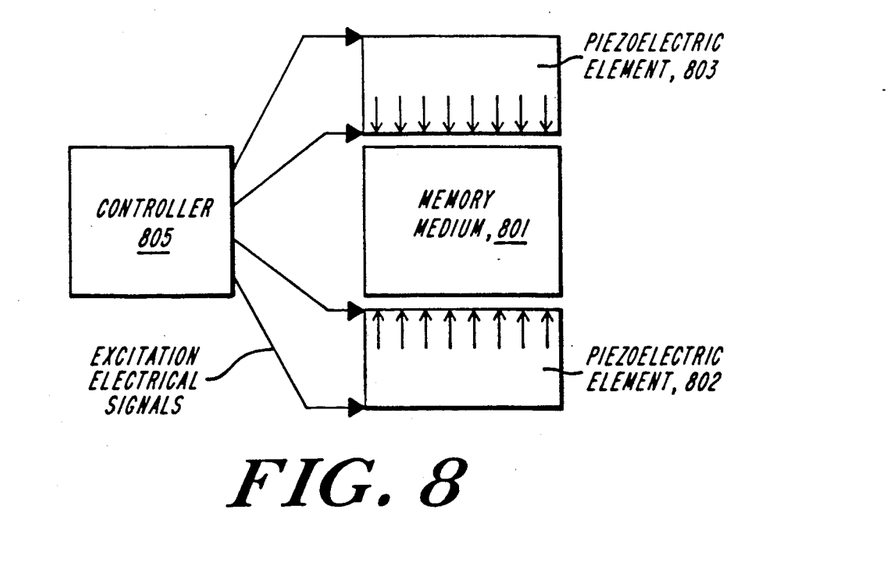
FIG. 8 is a schematic diagram depicting a further embodiment of the invention, utilizing piezoelectric elements to generate rearrangement of the spectral hole Profile by applying physical stress.

Broadening and rearrangement of the spectral hole profile can also be induced by physical elements, as depicted in FIG. 8. It is known that physical stress applied to the SHB sample can modify the local environment of each recording location, resulting in a modification of the absorption wavelength. FIG. 8 depicts a configuration for generating stress-induced broadening. Piezoelectric elements 802 and 803 are placed in contact with opposite sides of memory medium 801.

When the piezoelectric elements are excited by an electrical signal applied by a controller element, the piezoelectric elements apply a physical stress to the medium 801, generating an internal electric field and Stark effect broadening. By controlling the magnitude of the applied physical stress, the system can address holographic images recorded at different stress field magnitudes.

TOTAL STORAGE CAPACITY

Total storage capacity of the illustrated can be calculated. Assuming a spatial light modulator composed of 1000 by 1000 elements, a single hologram can contain as many as $10^6$ bits. For a material having an inhomogeneous width of 10 terahertz (10 nanometers) and a homogeneous width of 10 megahertz, the system can create at least one absorption structure every 1 gigahertz, so that $10^4$ frequencies can be used for storage. Several molecular species could be used simultaneously in the same material to provide storage. A reasonable estimate would be five species. Accordingly, there can be as many as $5 \times 10^4$ frequencies available for storage of data. By varying the reference beam angle, as many as 500 holograms can be stored at each wavelength. Employing the Stark effect or stress-induced broadening can Provide as many as 100 independent field strengths at each frequency, giving $2.5 \times 10^{15}$ bits per cubic centimeter. This compares favorably with classical 1/lambda$^3$ holographic storage density (lambda = 600 nanometers yields $5 \times 10^{12}$ per cubic centimeter.

Where system requirements permit a trade-off in hologram efficiency for data storage, holograms having approximately 0.1 percent efficiency can be employed. This would permit 200 holograms, each requiring a reference beam incident at a separate angle. In turn, the 200 hologram capacity would provide a storage capacity of $10^{15}$ bits per cubic centimeter. This compares favorable with classical 1/lambda$^3$ holographic storage density (lambda = 600 nanometers yields $5 \times 10^{12}$ bits per cubic centimeter.

System capacity is likely to be limited only by the availability of molecules for storage. The extra degrees of freedom provided by the invention in frequency space and in electric field and stress field space may allow such a system to become technically realizable.

The invention thus provides multidimensional optical storage in spectral hole burning (SHB) materials to realize an ultra-dense digital random access memory. While conventional volume holography is unable to achieve storage densities greater than about one bit per cubic micrometer, the invention provides an additional factor of $10^3$ in storage density by using the frequency diversity available from SHB materials.

In particular, the combination of holographic storage, frequency channelling, and the added dimension of applied electric field permits enormous storage densities to be achieved, far exceeding the limits of conventional holographic storage. By potentially providing storage densities as high as $2.5 \times 10^{15}$ bits/cm$^3$ of material, useful memories of enormous capacity could be extremely compact and also operate with very low power consumption. Because of the intrinsically parallel manner of reading and writing of data as holograms the potential data rate is extremely high. Moreover, the frequency channeling approach enables the storage of high efficiency holograms, and thereby facilitates cascaded memory implementations, as may be utilized in a neural net computer.

The invention thus addresses two significant optical data storage issues. The first is the use of spectral hole burning and parametric control enhancements to permit access to the full storage capacity of the volume medium. Frequency channeling and Stark effect broadening enable further increases in data storage density and access, providing extra degrees of freedom in frequency space and in electric field space. A second consideration is that access to the data must not interfere with data storage, and must not cause erasure of stored data. The utilization of phase holograms satisfies these criteria.

It will thus be seen that the invention efficiently attains the objectives set forth above, among those made apparent from the preceding description. In particular, the invention provides a high-capacity, high access speed memory system.

It will be understood that changes may be made in the above construction and in the foregoing sequences of operation without departing from the scope of the invention For example, various methods can be used for wavelength selection of the reading and writing lasers. Several methods for steering the reading and writing lasers in two orthogonal angular direction can be employed, and holographic or reflective optics can be used in place of the refractive optical elements illustrated in the Figures. Additionally, data storage can also be achieved on the basis of the Stark effect alone, using a fixed frequency laser Data is recorded at selected electric field strengths and read out by sweeping the electric field.

It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is 1. Memory apparatus for read/write storage and retrieval of digital data, the apparatus comprising optical storage means including a multidimensional holographic storage medium for storing phase holographic images representative of the digital data, selected regions of said medium containing said holographic images being independently addressable by an interrogating beam of light characterized by selected spatial positions, said holographic storage medium comprising a spectral hole burning material having absorption regions independently addressable by an interrogating beam of light having a selected frequency, said spectral hole burning material comprising selectively bleached absorption structures forming addressable frequency channels, and said phase holograms being stored in index modulation regions near spectral hole absorption edges.

2. Apparatus according to claim I, further comprising frequency channeling means for providing controlled bleaching of said spectral hole burning material to generate said bleached absorption structure frequency channels in said spectral hole burning material.

3. Apparatus according to claim 2, wherein said frequency channeling means comprises a narrow linewidth tunable laser.

4. Apparatus according to claim 2, further comprising means for applying an external electric field of selected voltage to said optical storage medium to induce Stark effect broadening of said spectral holes, so that at a given frequency of interrogating light, a different phase hologram can be stored for each of a plurality of voltages, whereby multiple phase holograms can be stored for each frequency of interrogating light.

5. Apparatus according to claim 4, further comprising Stark effect control means for controlling voltage of the applied electric field to address holographic images recorded at selected electric field strengths.

6. Apparatus according to claim 2, further comprising means for applying a physical stress of selected magnitude to said optical storage medium to induce broadening of said spectral holes, whereby at a given frequency of interrogating light, a different phase hologram can be stored for each of a plurality of stress field magnitudes, such that multiple phase holograms can be stored for each frequency of interrogating light.

7. Apparatus according to claim 6, further comprising physical stress control means for controlling the magnitude of the physical stress applied to said optical storage medium to address holographic images recorded at selected stress field magnitudes.

8. Apparatus according to claim 6, wherein said means for applying physical stress to said optical storage medium comprises at least one piezoelectric element in contact with at least one surface of said optical storage medium, said piezoelectric element being excitable by an applied electrical signal to apply a selected physical stress to said optical storage medium.

9. Apparatus according to claim 1, further comprising read/write means for reading and writing holographic images into and out of said medium, said read/write means comprising a frequency agile laser for generating an interrogating beam of laser light having at least one selected frequency.

10. Apparatus according to claim 9, wherein said read/write means further comprises spatial light modulator means interposed between said frequency agile laser and said medium, for providing selected spatial modulation of said interrogating beam of laser light.

11. Apparatus according to claim 9, further comprising beam steering means, in combination with said frequency agile laser, for steering said laser beam in at least a first direction.

12. Apparatus according to claim 11, further comprising control means for controlling said interrogating beam independently in frequency and spatial position.

13. Apparatus according to claim 12, wherein said control means comprises a microprocessor.

14. Apparatus according to claim 1, wherein said spectral hole burning material comprises porphyrin tautomers in a polyethylene matrix.

15. Apparatus according to claim 1 wherein said spectral hole burning material comprises organic dyes in organic polymer host materials.

16. Apparatus according to claim 1 wherein said spectral hole burning material comprises organic dyes in inorganic host materials.

17. Apparatus according to claim 1 wherein said spectral hole burning material comprises color centers in glass.

18. A method for storing digital data, the method comprising the steps of
configuring a multidimensional holographic storage medium from a spectral hole burning material,
utilizing a laser to generate in the spectral hole burning material a set of selectively bleached absorption structures, to form addressable frequency channels, and utilizing a laser to write phase holograms representative of the digital data in index modulation regions near spectral hole absorption edges.

19. Optical interconnection apparatus for selectively interconnecting an input plane and an output plane in accordance with selected interconnection encodings, the optical interconnection apparatus comprising
optical interconnection storage means including a multidimensional holographic storage medium for storing phase holographic images representative of the interconnection encodings,
selected regions of said medium containing said holographic images being independently addressable by an interrogating beam of light characterized by selected spatial positions,
said holographic storage medium comprising a spectral hole burning material having absorption regions independently addressable by an interrogating beam of light having a selected frequency,
said spectral hole burning material comprising selectively bleached absorption structures forming addressable frequency channels, and
said phase holograms being stored in index modulation regions near spectral hole absorption edges.

20. Apparatus according to claim 9, further comprising
feedback means for transmitting feedback signals from selected nodes in the output plane to selected nodes in the input plane.

21. Optical computing apparatus for digital information processing, the computing apparatus comprising
optical storage means including a multidimensional holographic storage medium for storing phase holographic images representative of digital data,
selected regions of said medium containing said holographic images being independently addressable by an interrogating beam of light characterized by selected spatial positions, said holographic storage medium comprising a spectral hole burning material having absorption regions independently addressable by an interrogating beam of light having a selected frequency,
said spectral hole burning material comprising selectively bleached absorption structures forming addressable frequency channels,
said phase holograms being stored in index modulation regions near spectral hole absorption edges.

* * * * *